UNITED STATES PATENT OFFICE.

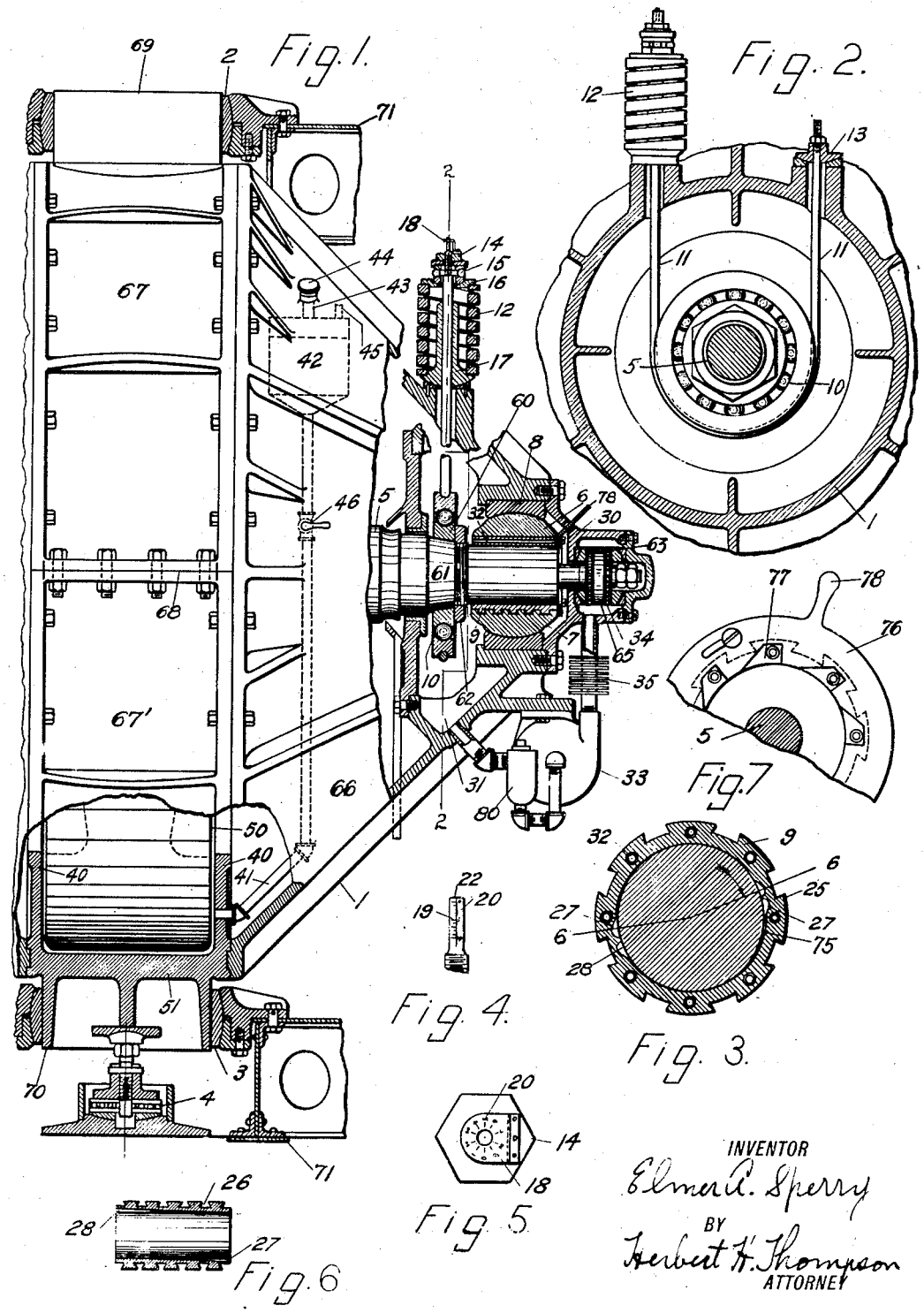

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

STABILIZING-GYROSCOPE.

1,358,258.

Specification of Letters Patent.  Patented Nov. 9, 1920.

Application filed December 2, 1915. Serial No. 64,616.

*To all whom it may concern:*

Be it known that I, ELMER A. SPERRY, citizen of the United States of America, residing at Brooklyn borough, city and State of New York, have invented certain new and useful Improvements in Stabilizing-Gyroscopes, of which the following is a specification.

This invention relates to structural details of large gyroscopes and especially to a novel form of bearing adapted for the heavy rotors of gyroscopes used in stabilizing large ships and in means for preventing damage to the same. Such rotors weigh as much as 60,000 pounds, run at high speeds and possess an enormous amount of inertia. The provision of suitable bearings and the proper lubrication thereof, presents an unusual problem, since the entire gyroscopic stabilizing moment is exerted through the journals and bearings. Moreover this pressure is extremely variable, occurring first in one direction and then in the other, so that very severe operating conditions are imposed.

The cooling and lubricating features of my invention although disclosed in this application are not claimed herein, but have been made the subject of a divisional application filed September 14, 1917, Serial No. 191,329.

It will be obvious to those skilled in the art that my invention is adapted for other uses, than the specific use indicated above, so I wish it to be understood that I do not regard my invention as limited to the art of gyroscopes.

Referring to the drawings in which what I now consider to be the preferred form of my invention is shown, Figure 1. is an elevation, partly in section, of a portion of a stabilizing gyroscope. Fig. 2. is a section on broken line 2—2 of Fig. 1. Fig. 3, is an enlarged cross section of a portion of the journal showing the babbitted part of the bearing. Figs. 4 and 5 are details of the adjusting means for the spring supporting one portion of the journal.

Fig. 6 is a longitudinal section of the babbitt or other lining of the bearing on line 6—6 Fig. 3. Fig. 7 is a detail of the bearing.

A portion of the casing of a horizontal gyroscope is shown at 1. It is preferably built up in sections, comprising a pair of similar conical end portions 66 and a two part circular central portion 51, the parts 67 and 67' being bolted or otherwise secured together at 68. The two parts 67, 67' are provided with cylindrical extensions 69, 70 which are journaled in large and powerful selfalining vertical bearings 2 and 3 secured to fixed portions 71 of the ship. These bearings are designed to take up the working stresses of the gyroscope without regard to the friction created, as friction about the vertical axis is not an undesirable feature. The heat created is readily dissipated by making journals 69 and 70 hollow and of ample size. The interior of central parts 67, 67' is preferably provided with ribs or flanges 40, so that they have a U cross section which is well adapted to withstand the severe bending stresses applied thereto through gyroscopic reaction. Ribs 40 also act as wind shields for the rotor so that only a small portion of the air remaining in casing 1, after it is exhausted, is set in motion by the wheel. The weight of the entire gyroscope is supported on an adjustable thrust bearing 4.

The rotor 50 is mounted on shaft 5, which is journaled in the novel form of bearing in frame 1, which forms one of the principal subjects of this invention.

After many attempts to use standard forms of bearings for the rotor shaft 5, both of the anti-friction and ordinary types, had resulted in failure, it was found that the anti-friction type was impracticable on account of the heavy working loads while the chief cause of trouble with the ordinary type seemed to occur while the rotor was being started. It was found that when the rotor was at rest, the journal would become dry and that when it was started a large portion of the bearing metal would be ground out. As soon as the rotor had picked up speed, the trouble ceased as the lubrication then became perfect. To overcome these difficulties, I prefer to construct this bearing in two or more distinct parts. Portion 6, which may be termed the main bearing, preferably comprises a ring 7 having a universal mounting in a part 8 fixed in casing 1. Ring 7 is lined with some form of anti-friction metal 9.

The second portion 10 of said bearing is preferably not fixed to casing 1, but is so supported therefrom as to only support the weight of the rotor, leaving the main bearing to absorb the working loads described above. Bearing 10 is of the anti-friction type, being shown as a ball bearing which is resiliently and universally supported from casing 1, as by a strap or cables 11 hung from the casing by means of one or more strong springs 12. Strap 11 may have one end secured to a washer or nut 13 universally mounted on casing 1, while the other end is provided with a nut 14 threaded on the end of the strap. Nut 14 bears against anti-friction washers 15, which rest on a plate 16 against which spring 12 has its seat. The lower end of the spring bears against some form of bearing block 17 resting on casing 1. The tension of spring 12 may be accurately adjusted by means of nut 14 so that bearing 10 may support the full weight of the rotor and no more. Indicating means are preferably provided on nut 14, which may consist of a thin disk 18 which is readable on vertical graduations 19 on reduced extension 20 of strap 11. Disk 18 is also preferably provided with circular graduations 21 readable upon an index line 22 on stem 20, whereby a micrometer adjustment is obtained.

The inner ring 60 of the bearing, forming the inner race may be securely mounted on shaft 5 by driving or forcing it on a tapered portion 61 of said shaft. A nut 62 may be used both to force it on and hold it in place.

In addition to the two radial bearings 6 and 10 a thrust bearing 34 is employed to take up the end thrust of the rotor, which is caused primarily by the rolling of the ship. I prefer to construct this bearing so as to absorb thrust in both directions, as by the two universally mounted ball bearings 63, 64 placed on opposite sides of the collar 65 on shaft 5.

On account of the heavy loads imposed on bearing 6, I prefer to provide a special oiling and cooling system therefor. The babbitt is firmly secured to ring 6, preferably by double dove tails 25, 26 extending at an angle to each other. The babbitt is provided with a plurality of axially extending apertures or grooves 27, 28. The apertures 27 serve to supply the bearing with oil, which is forced or flows into said apertures from right to left in Figs. 1 and 6, that is from receptacle 30 along the shaft and into receptacle 31. Grooves 27 are so designed that the oil cannot escape directly therefrom to receptacle 31 without flowing along and around shaft 5. This is preferably accomplished by making the apertures tapering inwardly as shown in Fig. 6. Another feature is that the grooves 27 have a circumferentially extending cut-away portion 75 which aids the journal in carrying the oil around with it. The other apertures 28 serve to scrape the used oil and pulverized bearing metal from the journal and to lead this material into receptacle 30. They are designed so that the oil will run therefrom into basin 31, as by tapering them oppositely to grooves 27.

As the main stresses due to gyroscopic reaction are lateral, I prefer to locate apertures 27 on opposite sides of the bearing.

I also prefer to provide artificial cooling means for the bearing, such as pipes or apertures 32, which extend through the babbitt, furnishing a plurality of passages for a cooling fluid. In the embodiment shown the lubricating oil is caused to flow through said passages. In order to cause a positive circulation of the oil, a pump 33 is provided, which draws oil from the basin 31 through strainer 80 and pumps it into receptacle 30, through the thrust bearing 34. Cooling means, such as ribs 35 may be located on the pipes connecting the pump with the oil wells. Means may be provided to regulate the flow of cooling fluid through pipes 32. I have shown for this purpose an annular plate 76 (Fig. 7) provided with saw-tooth incisions 77 adapted to be brought into and out of register with the ends of pipes 32. A handle 78 extends from plate 76 without the casing 1 for manipulating the plate.

I also prefer to equip the gyroscope with some form of powerful brake, so that in case one of the bearings should fail, the rotor may be brought to a stop quickly, before the bearing and shaft are both ruined. In dealing with rotors of such high moments of inertia, a difficult problem was presented to destroy this tremendous energy in a short time and at the same time not to develop too much heat, especially where the rotor is inclosed in a close fitting evacuated casing. Connected to one of flanges 40, described above, I provide a pipe 41, which leads to a reservoir 42 adapted to be filled with oil or other liquid, from without case 1 through a pipe 43 normally closed by cap 44. Reservoir 42 may be entirely closed except for pipes 41 and 43 and a vent 45, to allow the ready-out-flow of the oil on the turning of cock 46 in pipe 41. When it is desired to brake the rotor, all that need be done is to turn said cock, when the oil will quickly fill the space between flanges 40 and casing 1 and the rotor, around its entire periphery. Such a film of oil is found to act as an exceedingly powerful and effective brake, which will not overheat.

The operation of my invention is as follows: As the rotor is being started, the entire load is taken by the anti-friction bearing 10, as the gyroscopic moment does not arise until the rotor has attained an appreciable speed, so that no load is placed on the main bearing until it has become properly lubricated. Overheating of bearing 6 is prevented by the cooling pipes 32, the extent of the cooling being regulated by plate 76. When the ship rolls or tends to roll, a powerful torque is exerted on journals 69, 70. This torque is transmitted to the rotor through the channel sections 67, 67', conical ends 66, and bearings 6. According to the law of gyroscopes, this torque will cause the gyroscope to turn or precess in bearings 2, 3 and to exert a powerful gyroscopic moment which opposes the rolling of the ship through the medium of bearing 6, casing 1 and journals 69, 70. If the bearings or other parts of the gyroscope should break, the rotor may be quickly brought to a stop by turning cock 46, as explained.

In accordance with the provisions of the patent statues, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the general results outlined, and the invention extends to such use.

Having described my invention, what I claim and desire to secure by Letters Patent is:

1. The combination with a gyroscopic rotor and a journal frame therefor, of a main bearing and an auxiliary bearing for said rotor, one of said bearings being of the anti-friction type.

2. The combination with a gyroscopic rotor and a journal frame therefor, of a main bearing and an auxiliary bearing for said rotor, each of said bearings being universally mounted upon said frame.

3. The combination with a gyroscopic rotor and a journal frame therefor, of a main bearing and an auxiliary bearing for said rotor, and means whereby the relative loads taken by the two bearings may be adjusted.

4. The combination with a gyroscopic rotor and a journal frame therefor, of a main bearing and an auxiliary bearing for said rotor, one of said bearings being resiliently supported upon the frame.

5. The combination with a gyroscopic rotor and a journal frame therefor, of a main bearing and an auxiliary bearing for said rotor, one of said bearings being of the anti-friction type and resiliently supported upon the frame.

6. The combination with a gyroscopic rotor and a journal frame therefor, of a main bearing, adapted to take up the working stresses of the rotor and an auxiliary bearing adapted to support the dead load of the rotor.

7. The combination with a gyroscope, of a journal frame therefor, an auxiliary bearing for the rotor, and resilient means for supporting said bearing from said frame.

8. The combination with a gyroscope, of a journal frame therefor, an auxiliary bearing for the rotor, and adjustable means for supporting said bearing from said frame.

9. The combination with a shaft, of a bearing therefor comprising a resiliently supported part adapted to take the dead load on the shaft and a second part for receiving the working loads.

10. A means for preventing the scoring of a bearing before the oil has fully lubricated it comprising an auxiliary anti-friction bearing and means for supporting said bearing whereby said bearing receives only a predetermined portion of the load.

11. In a gyroscope, a rotor, a casing and bearings therefor, a supply of fluid under control, and means for flooding that portion of the casing adjacent said rotor with said fluid to apply a fluid brake.

12. In a gyroscope, a rotor, a casing having side flanges closely surrounding the periphery and faces of said rotor, a supply of fluid, and means whereby that portion of the casing adjacent the rotor may be flooded with said fluid in contact with the rotor, to brake the same.

13. In a gyroscopic apparatus the combination with a rotor and a casing inclosing said rotor, of means for braking said rotor comprising a supply of fluid and means controlled from without said casing for releasing said fluid within the casing.

14. In a gyroscopic apparatus the combination with a rotor and a casing inclosing said rotor, of means for braking said rotor comprising a supply of fluid within the casing and means controlled from without said casing for releasing said fluid within the casing.

15. In a stabilizing gyroscope, a casing comprising a central member having a channel section, a precession journal on said member, a pair of conical end plates, and a bearing for the rotor adjacent the apex of each cone.

16. An auxiliary anti-friction bearing for gyroscopes comprising an inner race adapted to be forced on a tapered portion of the rotor shaft, rolling elements, and an outer race universally supported from a fixed portion of the gyroscope.

17. In a gyroscope, a rotor, a plurality of detachable members of U-shaped cross-section surrounding said rotor to reduce the clearance on both sides of the rotor, a pair of end plates, one detachably secured to each of the opposite sides of said members adjacent its periphery and a rotor bearing carried by each end plate.

18. In a gyroscope, a rotor, a member of U-shaped cross-section surrounding said rotor, a pair of trunnions extending therefrom for pivotally supporting the gyroscope, a pair of conical end plates, one secured to each of the opposite sides of said member and adjacent its periphery and a rotor bearing carried by each plate.

19. In a gyroscopic apparatus, a rotor, a journal frame therefor, radial bearings for said rotor, and a thrust bearing adjacent one end of the rotor shaft adapted to receive end thrust in both directions.

20. In a gyroscopic apparatus, a rotor, a journal frame therefor, radial bearings for said rotor, and a universally supported thrust bearing adjacent one end of the rotor shaft adapted to receive end thrust in both directions.

21. A stabilizing gyroscope for ships comprising a rotor positioned with its spinning axis horizontal, a bearing frame for the rotor, a plurality of vertical universal radial bearings for securing said frame to the ship and a universally supported thrust bearing for supporting the weight of the gyroscope.

22. A stabilizing gyroscope for ships comprising a rotor positioned with its spinning axis horizontal, a bearing frame for the rotor, a plurality of vertical universal radial bearings for securing said frame to the ship and an adjustable thrust bearing for supporting the weight of the gyroscope.

23. In combination, a rotating element, a shaft supporting said rotating element, a bearing for taking up the force exerted by said shaft in one direction perpendicular to the axis of said shaft and a second bearing for taking up the force exerted by said shaft in a direction perpendicular to said shaft but at an angle to said first mentioned direction.

24. In a gyroscope, a rotating element, a casing inclosing the same and means for changing the speed of said rotating element by changing the medium between said rotating element and said casing.

25. In a gyroscope, the combination with a rotor, an annular member surrounding the same and forming the central member of the gyroscope casing, means inside of said member and extending on each side of the rotor rim for reducing clearance, and a pair of conical bearing members secured to either side of said annular member.

26. In a gyroscope, the combination with a rotor, an annular member surrounding the same and forming the central member of the gyroscope casing, means inside of said member and extending on each side of the rotor rim for reducing clearance, a pair of conical bearing members secured to either side of said annular member, a support for said casing, and pivotal means extending between said support and said annular member.

In testimony whereof, I have signed my name to this specification this 22nd day of November 1915.

ELMER A. SPERRY.